US010748154B2

(12) United States Patent
Barnhardt et al.

(10) Patent No.: US 10,748,154 B2
(45) Date of Patent: Aug. 18, 2020

(54) SYSTEM AND METHOD USING MULTIPLE PROFILES AND SCORES FOR ASSESSING FINANCIAL TRANSACTION RISK

(71) Applicant: Early Warning Services, LLC, Scottsdale, AZ (US)

(72) Inventors: David W. Barnhardt, Cornelius, NC (US); Anthony J. Selway, Phoenix, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 685 days.

(21) Appl. No.: 15/390,197

(22) Filed: Dec. 23, 2016

(65) Prior Publication Data
US 2018/0181962 A1 Jun. 28, 2018

(51) Int. Cl.
*G06Q 20/40* (2012.01)
*G06Q 20/22* (2012.01)

(52) U.S. Cl.
CPC ....... *G06Q 20/4016* (2013.01); *G06Q 20/223* (2013.01)

(58) Field of Classification Search
CPC .......................... G06Q 20/4016; G06Q 20/223
See application file for complete search history.

(56) References Cited

U.S. PATENT DOCUMENTS

| 8,682,764 | B2 * | 3/2014 | Love | G06Q 10/10 |
| | | | | 705/35 |
| 2002/0111886 | A1 * | 8/2002 | Chenevich | G06Q 20/00 |
| | | | | 705/30 |
| 2009/0018934 | A1 * | 1/2009 | Peng | G06Q 20/4016 |
| | | | | 705/30 |
| 2009/0222369 | A1 * | 9/2009 | Zoldi | G06Q 10/10 |
| | | | | 705/35 |

(Continued)

FOREIGN PATENT DOCUMENTS

EP 0669032 A1 * 8/1995 ............. G06Q 40/02

OTHER PUBLICATIONS

Dharwa et al.: A Data Mining with Hybrid Approach Based Transaction Risk Score Generation Model (TRSGM) for Fraud Detection of Online Financial Transaction, Feb. 2011, International Journal of Computer Applications, vol. 16, No. 1, pp. 18-25. (Year: 2011).*

(Continued)

*Primary Examiner* — Bijendra K Shrestha
(74) *Attorney, Agent, or Firm* — Kilpatrick Townsend & Stockton LLP

(57) ABSTRACT

In response to a request for risk assessment of a person-to-person (P2P) payment transaction, a risk assessment system returns a payer risk score, a payee risk score and a joint/fusion risk score. Risk scores are based on large amounts of data (including transaction data) provided by multiple financial institutions. The data is sorted and linked to individual people (e.g., common account holders), and assembled by a (Continued)

profile system into payee, payer and joint profiles for purposes of risk evaluation. A database associated with a profile system separately stores the profiles (and associated risk scores). Risk scores (payer, payee and joint) are provided for a transaction in response to a payer ID, a payee ID and transaction data.

19 Claims, 10 Drawing Sheets

(56) References Cited

U.S. PATENT DOCUMENTS

| | | | | |
|---|---|---|---|---|
| 2010/0250364 | A1* | 9/2010 | Song | G06Q 20/02 705/14.47 |
| 2012/0078791 | A1* | 3/2012 | Huang | G06Q 20/02 705/44 |
| 2012/0143761 | A1* | 6/2012 | Doran | G06Q 20/08 705/44 |
| 2014/0172695 | A1* | 6/2014 | Kanjlia | G06Q 20/22 705/39 |
| 2016/0342976 | A1* | 11/2016 | Davis | G06Q 20/065 |
| 2017/0011397 | A1* | 1/2017 | Bhagat | G06Q 20/405 |
| 2017/0178110 | A1* | 6/2017 | Swanson | G06Q 20/223 |
| 2017/0270496 | A1* | 9/2017 | Clower | G06Q 20/4016 |

OTHER PUBLICATIONS

The Wolfsberg Group: Frequently Asked Questions on Risk Assessments for Money Laundering, Sanctions and Bribery & Corruption, 2015, pp. 1-28 (Year: 2015).*

Financial Services Authority (FSA): Bank's Management of High Money-Laundering Risk Situations, Jun. 2011, pp. 1-98 (Year: 2011).*

* cited by examiner

PAYER/SENDER PROFILE – PAYER ID # XXXX - S ↙ 510

TRANSACTION DATA

| | ROUTING # | ACCOUNT # | CUSTOMER NAME | CUSTOMER ADDRESS | CUSTOMER ID | PAYEE NAME/ID | TRXN AMOUNT | TRXN DATE | TRXN TYPE | PHONE #'S | TRXN STATUS |
|---|---|---|---|---|---|---|---|---|---|---|---|
| TRXN #1 | XXX | XXX | XXX | XXX | XXX | XXX | XXX | XXX | XXX | XXX | XXX |
| TRXN #2 | XXX | XXX | XXX | N/A | XXX | XXX | N/A | XXX | XXX | N/A | XXX |
| ... | | | | | | | | | | | |
| TRXN N | XXX | XXX | XXX | XXX | XXX | XXX | N/A | XXX | XXX | XXX | XXX |

↘ 520

ACCOUNT DATA

| | ROUTING # | ACCOUNT # | CUSTOMER NAME | CUSTOMER ADDRESS | CUSTOMER ID | OPENED DATE | CLOSED DATE | EMAIL ADDRESS | DEVICE # | DATE DEVICE REG. | PHONE #'S | ACCOUNT STATUS |
|---|---|---|---|---|---|---|---|---|---|---|---|---|
| ACCT #1 | XXX | XXX | XXX | XXX | XXX | XXX | XXX | XXX | XXX | XXX | XXX | XXX |
| ACCT #2 | XXX | XXX | XXX | XXX | XXX | XXX | N/A | XXX | XXX | XXX | XXX | XXX |
| ... | | | | | | | | | | | | |
| ACCT N | XXX | XXX | XXX | XXX | XXX | XXX | N/A | XXX | XXX | XXX | XXX | XXX |

↘ 522

PERSONAL DATA ↙ 530

| NAME | ADDRESS | PERSONAL ID #1 | PERSONAL ID #2 | EMAIL ADDRESS | PHONE #'S | FRAUD/ABUSE CODES |
|---|---|---|---|---|---|---|
| XXX | XXX | XXX | XXX | XXX | XXX | XXX |
| | | | | | | XXX |

↘ 524

CURRENT PAYER SCORE: XXX

FIG. 5A

PAYEE/RECEIVER PROFILE – PAYEE ID # XXXX - R  ⟵ 540

TRANSACTION DATA  ⟵ 550

| | ROUTING # | ACCOUNT # | CUSTOMER NAME | CUSTOMER ADDRESS | CUSTOMER ID | PAYER NAME/ID | TRXN AMOUNT | TRXN DATE | TRXN TYPE | PHONE #'S | TRXN STATUS |
|---|---|---|---|---|---|---|---|---|---|---|---|
| TRXN # 1 | XXX | XXX | XXX | XXX | XXX | XXX | XXX | XXX | XXX | XXX | XXX |
| TRXN # 2 | XXX | XXX | XXX | N/A | XXX | XXX | N/A | XXX | XXX | N/A | XXX |
| ... | | | | | | | | | | | |
| TRXN N | XXX | XXX | XXX | XXX | XXX | XXX | N/A | XXX | XXX | XXX | XXX |

ACCOUNT DATA

| | ROUTING # | ACCOUNT # | CUSTOMER NAME | CUSTOMER ADDRESS | CUSTOMER ID | OPENED DATE | CLOSED DATE | EMAIL ADDRESS | DEVICE # | DATE DEVICE REG. | PHONE #'S | ACCOUNT STATUS |
|---|---|---|---|---|---|---|---|---|---|---|---|---|
| ACCT # 1 | XXX | XXX | XXX | XXX | XXX | XXX | N/A | XXX | XXX | XXX | XXX | XXX |
| ACCT # 2 | XXX | XXX | XXX | XXX | XXX | XXX | XXX | XXX | XXX | XXX | XXX | XXX |
| ... | | | | | | | | | | | | |
| ACCT N | XXX | XXX | XXX | XXX | XXX | XXX | XXX | XXX | XXX | XXX | XXX | XXX |

⟵ 552

PERSONAL DATA  ⟵ 560

| NAME | ADDRESS | PERSONAL ID #1 | PERSONAL ID #2 | EMAIL ADDRESS | PHONE #'S | FRAUD/ABUSE CODES | |
|---|---|---|---|---|---|---|---|
| XXX | XXX | XXX | XXX | XXX | XXX | XXX | XXX |

⟵ 554

CURRENT PAYEE SCORE: XXX

FIG. 5B

JOINT PROFILE – JOINT PAYER/PAYEE ID # XXX – J1 ⟵ 570

TRANSACTION

| | PAYER ROUTING # | PAYER ACCOUNT # | PAYEE ROUTING # | PAYEE ACCOUNT # | PAYER NAME/ID | PAYEE NAME/ID | TRXN AMOUNT | TRXN DATE | TRXN STATUS |
|---|---|---|---|---|---|---|---|---|---|
| TRXN # 1 | XXX | XXX | XXX | XXX | XXX | XXX | XXX | XXX | XXX |
| TRXN # 2 | XXX | XXX | XXX | N/A | XXX | XXX | XXX | XXX | XXX |
| ⋮ | | | | | | | | | |
| TRXN N | XXX | XXX | XXX | XXX | XXX | XXX | XXX | XXX | XXX |

⟵ 586

CURRENT JOINT/FUSION SCORE: XXX ⟵ 590

FIG. 5C

SYSTEM AND METHOD USING MULTIPLE PROFILES AND SCORES FOR ASSESSING FINANCIAL TRANSACTION RISK

BACKGROUND OF THE INVENTION

As fraudsters have become more sophisticated in conducting fraudulent transactions, banks and other organizations impacted by fraud have sought to improve systems that assess transaction risk prior to completing a transaction.

Many different forms of financial transactions can be conducted fraudulently, such as paper checks, ACH and other electronic credits/debits to bank accounts, wire transfers from one account to another, and person-to-person (P2P) payments.

Most systems for detecting fraudulent transactions typically look at only one party to the transaction and may have limited risk data available. For example, in traditional paper check transactions, a bank receiving a check for deposit and wanting to assess counterfeit risk may look only at the identified payer (e.g., to determine if the identified check writer has a name or an account that appears on a list of names or accounts associated with past counterfeit activity). This does little to reduce risk unless the check is from a known counterfeiter. In other cases, a bank may only look at the payee, for example, when a check is being deposited to a payee account. The bank may check to see if the account holder/payee appears on lists of people or accounts associated with past account abuse or fraud. This may provide little protection to an honest account holder, who may be the victim of fraud and does not know when a check may have come from someone engaged in fraud.

It has been difficult for banks to conduct a comprehensive risk analysis of a transaction involving an assessment of both the payer and the payee, either one of which may be a victim of fraud or a perpetrator of fraud. The bank may only have useful information on one party to the transaction (its own customer having an account at that bank) and information on the other party may be very limited.

This problem may be particularly difficult in the case of a person-to-person (P2P) payment or similar electronic payment transfers, where a bank may receive authorization from an account holder (through a P2P payment system) to withdraw money from a payer account at the bank and send the money to a P2P system, where it is subsequently forwarded to a payee. A bank receiving such an authorization has little, if any, information on the ultimate payee. The P2P payment system processing the payment may have information on the payer/sender by virtue of a payment account set up with the P2P system (with personal information on the payer/sender, including bank accounts from which payment transfers are to be funded), but unless the payee/receiver also has a payment account with the same P2P system, the P2P system may have no information on the payee/receiver, other than perhaps an email address or phone number for use in notifying the payee that money is available through the payment system.

There is thus arisen a need for systems having better and more comprehensive evaluation of available data to determine whether a transaction involves fraud or other financial risk.

BRIEF SUMMARY OF THE INVENTION

There is provided, in accordance with embodiments of the present invention, a system and method for providing, in response to a request from an inquiring institution, risk assessment of a payment transaction that includes a payer score, a payee score and a joint/fusion score. Scores are based on evaluation of a payer profile (profile data relating to the payer in the transaction), a payee profile (profile data relating to the payee in the transaction) and a joint profile (profile data relating to both parties in the transaction).

In one embodiment, a system for evaluating risk associated with a payment transaction between a payer and a payee includes a data aggregating system, a linking system, a profile system and a risk assessment system. The data aggregating system receives, from a plurality of financial institutions, account data associated with a plurality of accounts maintained at the financial institutions, wherein the account data includes at least transaction data pertaining to transactions conducted against each of the plurality of accounts. The linking system receives the account data from the data aggregating system, evaluates the account data, and identifies account data representing transactions and accounts that each have a common element relating to a specified person. The profile system (1) receives, from the data aggregating system, account data identified by the linking system as representing transactions and accounts having common elements relating to a specified person, and for the identified account data, (2) assigns at least a portion of the identified account data to a payer profile, the payer profile having account data pertaining to the specified person as a payer, (3) assigns at least a portion of the identified account data to a separate payee profile, the payee profile having account data pertaining to the specified person as a payee, and (4) assigns at least a portion of the identified account data to a separate joint profile, the joint profile having account data pertaining to a transaction between the specified person and at least one other party, wherein each specified person has a corresponding payer profile, payee profile, and joint profile. The risk assessment system evaluates, for a specified payment transaction having an identified payer and an identified payee, risk associated with the specified transaction, based on at least the payer profile for the identified payee, the payee profile for the identified payee, and the joint profile pertaining to both the identified payer and the identified payee A more complete understanding of the present invention may be derived by referring to the detailed description of the invention and to the claims, when considered in connection with the Figures.

BRIEF DESCRIPTION OF THE DRAWINGS

FIG. 5A illustrates a payer profile and score created in the process seen in FIG. 4.

FIG. 5B illustrates a payee profile and score created in the process seen in FIG. 4.

FIG. 5C illustrates a joint profile and score created in the process seen in FIG. 4.

DETAILED DESCRIPTION OF THE INVENTION

Figure 1:
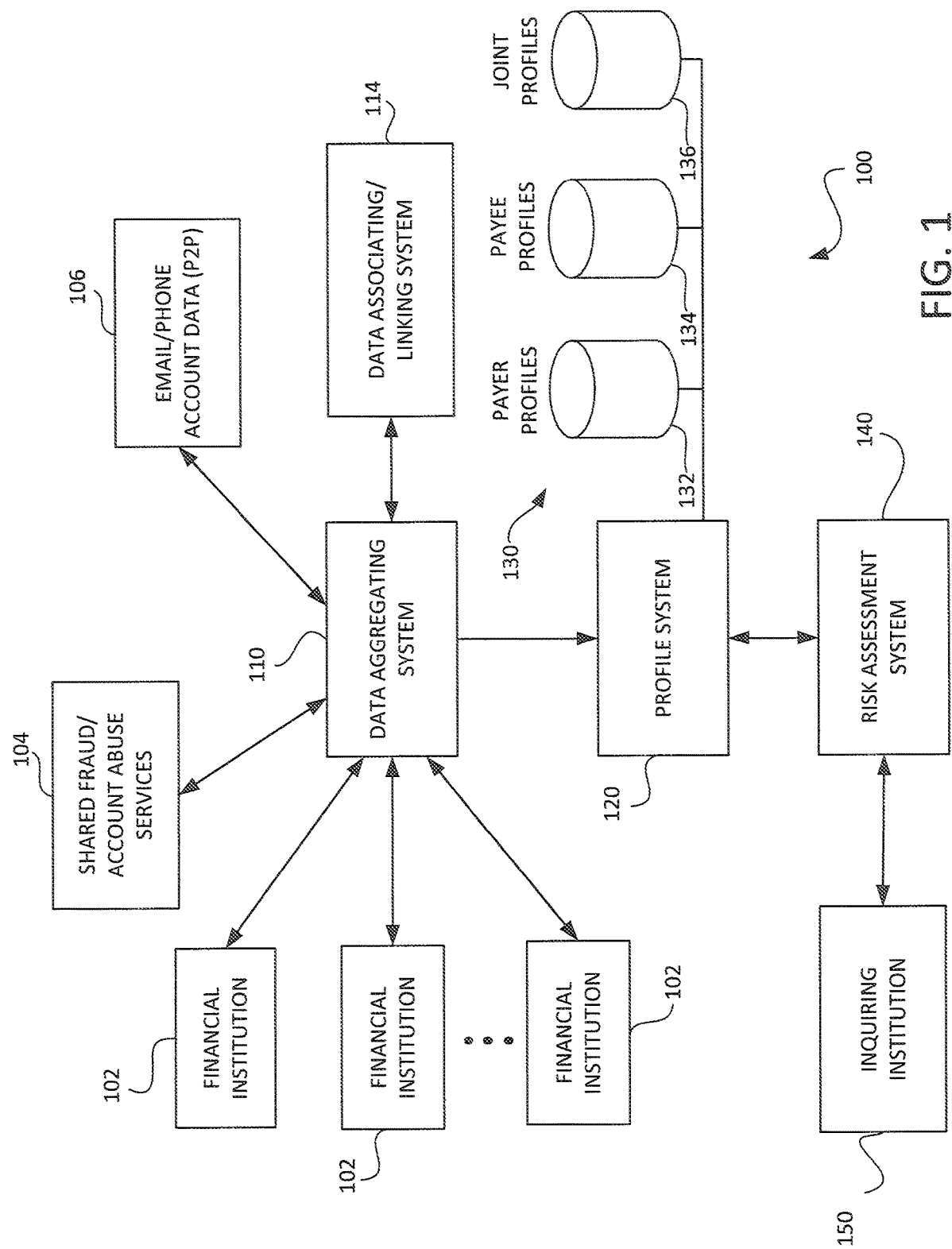
FIG. 1 is a general block diagram showing a system in which transactions, such as person-to-person (P2P) payments funded by accounts at financial institutions, are evaluated for risk using data associated with the payer and payee in the transactions, in accordance with embodiments of the invention.

There are various embodiments and configurations for implementing the present invention. Generally, embodiments provide systems and methods for assessing the risk of a transaction by analyzing profile data associated with each party to the transaction. In some embodiments, profile data may be assembled in advance of any transaction based on data from a plurality of banks and other institutions. As an example, banks (particularly large banks having many customers using branches across many states) may have large amounts of data on transactions conducted by bank customers with other parties, and have data relating to the accounts of their own customers. Such data can be analyzed in advance to create a profile for each person that may in the future conduct a transaction that needs to be assessed for risk. In one described embodiment, each person that may be a party to a transaction has a payer profile (profile data and a risk score for that person as a payer in a transaction), a payee profile (profile data and a risk score for that person as a payee in a transaction), and a joint (fusion) profile (profile data and a risk score for transactions between that person and the other person in a transaction). In some embodiments, the score associated with a profile may be calculated in advance when sufficient profile data is available for the person in question, and the score may then be updated as future transactions are conducted. In other embodiments, the score may be calculated on-demand (when requested for a specific transaction being conducted, based on the stored profile data for a person).

A specific implementation described herein relates to systems and methods for use in assessing risk associated with a payment-to-payment (P2P) transaction. Such transactions typically are made by a payer/sender who has established an account with a P2P payment system, has designated a financial account (such as a bank account or credit card account) that is used to fund such a transaction, and then identifies a payee/receiver, such as by name, cell phone number and/or email address, for use in notifying the payee of the payment. Further, embodiments herein anticipate that the bank maintaining the account used by the payer to fund the transaction will assess the risk before transferring money to the P2P payment system. However it should be appreciated in broader aspects of the invention, embodiments can be used to assess the risk with any type of transaction (e.g., paper checks, ACH transactions, credit card transactions, wire transfers and any other transactions involving payment from a payee to a payer). Further, the risk assessment may be provided not only to the bank from which funds are accessed to make the payment, but any other party or entity that may have some involvement or interest in the transaction, including (but not limited to) the bank maintaining an account (for the payee) into which funds are to be ultimately transferred, an entity processing the transaction (such as the P2P payment processor), and/or any of the direct parties to the transaction (payer, payee).

As mentioned earlier, aspects of the invention provide risk assessment and scores associated with both the payer and payee in a transaction. Such assessment scores are based on large amounts of data collected across large populations of people that may have accounts at financial and other institutions. Rules and models are developed to assess data (e.g., past transaction data, account data and other risk-relevant data) associated with a person and to assign a risk score to that person. In one embodiment, a score is separately assigned to the payer and payee in a transaction, and yet another score (joint/fusion score) score is assigned to the payer and payee in combination (i.e., reflecting a risk associated with a transaction between that specific payer and payee). Thus, in described embodiments there may be three types of scores associated with any given person, namely a payer score (reflecting risk associated with that person as a payer), a payee score (reflecting risk associated with that same person as a payee), and a joint/fusion score (reflecting a joint or combined risk associated with that same person and each other person with whom a transaction may be conducted and for whom data may be available in the system). As also mentioned earlier, in some cases scores may be calculated in advance and stored for use when a score (for a person) is requested. In other embodiments, scores may be calculated when a transaction in question is being conducted based on current profile data stored in a profile system (and also data on the specific transaction in question).

Further, while described embodiments relate to risk assessment for individuals (e.g., as a payer or payee), it should be appreciated that the payer or payee may in fact be an organization or entity (e.g., a company that is either a payer or payee in a P2P payment transaction). Further, a party to a transaction (payee or payer) may be more than one person (e.g., the co-owners of a joint account used for funding or receiving a payment), and risk scores maybe based on past data for those persons, either as individuals or acting together.

Referring now to FIG. 1, a system 100 according to one embodiment of the invention is illustrated. The system 100 collects data relating to individuals or entities that may be a payer or payee in a person-to-person (P2P) payment transaction. Most of the collected data may come from financial institutions 102, which provide account data on transactions conducted against accounts at those financial institutions (e.g., checks written from/deposited to an account, electronic debit/credit transactions against the account, and ACH transactions posted to the account), and account data relating to personal information on account holders and other information (such as account status) associated with each individual account at the financial institutions. However, other useful data may also be collected, such as data from shared fraud/account abuse database services 104 (which provide data from database(s) identifying individuals or entities that have been involved in possible fraud in the past or have been involved in possible account abuse in the past), and email/phone/personal information databases 106 from, e.g., third-party P2P payment systems that maintain data for individuals that may have provided personal data, as part of, for example, setting up an account with a P2P payment system. While the system 100 is illustrated as receiving data only from financial institutions 102, services 104 and databases 106, it should be appreciated that these data sources are only exemplary, and other relevant transaction, account and risk data may be available from other sources (e.g., credit card companies. loan companies, merchants, etc.) and could be used by the system 100. The data from the illustrated sources is extensive (particularly the transaction data relating to accounts at the financial institutions 102) and is provided to a data aggregating system 110.

In some embodiments, the financial institutions 102, services 104 and databases 106 may initiate a transfer of account data to the data aggregating system 110 on a periodic (e.g., daily or weekly) basis. In other embodiments, the aggregating system 110 may initiate the transfer of data by requesting data from each of the sources, either on a periodic basis or when data is needed for purposes of risk assessment. For example, a daily or weekly transfer of data may be sufficient in most cases for risk assessment, but when the risk assessment requires more up-to-date information, the data aggregating system 110 may request data (for all available account holders/individuals, or for a specific person) from any one of the sources that may have that data. The data aggregating system 110 stores the data that has been provided by the various sources for subsequent processing by a data associating/linking system 114.

As mentioned, the data coming from the various sources (102, 104 and 106) is likely to be extensive and relate to large numbers (perhaps millions—depending on the number of sources available) of account holders and other people with whom they have conducted transactions. The acquisition of data relating to such large numbers of individuals (and their past transactions) improves the likelihood that a useful payer, payee and joint score will be available for any transaction. The data coming from the financial institutions 102 is particularly useful in calculating scores, since it is likely to be frequently or continuously updated by the financial institutions and could include, among other things, every transaction (including recent transactions) conducted against all accounts at the financial institutions as well as current account ownership data (reflecting all personal and other data maintained by a bank, including account status) for every account maintained at the financial institutions.

The data associating system 114 receives account data from the data aggregating system 110 and analyzes such data to sort the data according to individuals to whom the data is relevant for purposes of risk assessment. For example, the system 114 may look at data from the financial institutions 102 to find a common (same) account holder, i.e., identify an individual that is an account holder on different accounts across one or more financial institutions. As a further example, the system 114 may identify an individual that that is common party to multiple transactions (e.g., involved as either a payer or payee), where the transactions may be posted to different accounts across one or more financial institutions. The system 114 may then associate or link the data from each of those accounts or transactions as related to the same individual, in order to assess the risk associated with that individual.

The associating system 114 may use a number of different approaches for linking individuals, transactions and accounts. For example, an account holder ID (such as a name or social security number) may be used to retrieve data from the data aggregating system 114 for each account holder that maintains an account at one or more the financial institutions 102. It should be appreciated that, in some circumstances, different accounts having a common account holder may not be always easy to identify. For example, an account holder may use a middle name for some accounts and not for others. In cases of joint account holders, some accounts may use the social security number of one joint account holder and other accounts may use the social security number of the other joint account holder. Further, typographical errors when setting up the account, very common account holder names (e.g., John Smith), different addresses that have not been updated, and other issues may make it difficult to find all accounts of a payer or payee in a transaction. For these reasons, more sophisticated systems may be used to associate all accounts having the same account holder (or all transactions having a common party), such as the system disclosed in U.S. Pat. No. 8,682,764 ("System and Method for Suspect Entity Detection and Mitigation," issued to Robin S Love, et al. on Mar. 25, 2014, commonly owned with the present application and hereby incorporated by reference in its entirety). Such system uses data linking and analysis to create a data node network associated with an entity, with data records pertaining to the entity (including transactions and accounts) linked so that they may be subsequently accessed for analysis. In the embodiments described herein, data records of interest would be those relating to financial accounts and financial activity, but in alternative embodiments other non-financial records collected and linked to a specific entity or person may (or may not) be used, depending on their value for risk assessment.

Once data records have been linked by the data associating system 114, profiles are built for individuals using a profile system 120. Examples of profiles will be illustrated and described later. Generally, all the data that can be linked to a single person is placed in a profile (a collection of data for that person) by the profile system 120, and then later used to create a risk score for that person. In one embodiment seen in FIG. 1, in a database 130 associated with the profile system 120, profiles are organized and stored separately as payer profiles 132, payee profiles 134 and joint profiles 136. Further, in one implementation, one individual may have a profile of each type, i.e., the same person may have a separate payer profile, reflecting data (and a payer risk score calculated from the data) for that person when conducting a transaction as a payer, a separate payee profile, reflecting the data (and a payee risk score) for that person when conducting a transaction as a payee, and one or more joint profiles, reflecting data (and a joint risk score) for that person when conducting a transaction with each of various other people whom that same person has or might conduct a transaction. Thus, in this particular implementation, there may be a separate joint profile reflecting data (and a risk score) for each possible pair of the individuals for whom data has been collected and stored in the profile system 120.

In some embodiments, profiles may be assembled only when needed to calculate a payer, payee and joint risk score, and may not be stored in database 130 in advance of risk score calculations, or may only be stored during the time needed for accessing profile data to create a risk score. In yet other embodiments, in lieu of storing significant data in each profile, the stored profiles may consist of only data needed to uniquely identify a person and a score (payer, payee and joint) for that person, with underlying data associated with the person retrieved (e.g., from another large database) when needed for analysis.

The data structure of the database 130 provides advantages in the operation and use of the risk system 100. For example, organizing payer, payee and joint profiles into separate and discrete data structures and memory locations makes the data in those profiles more readily accessed for purposes of calculating separate payer, payee and joint scores for one person. Furthermore, data for a payer profile, a payee profile and a joint profile is stored in those profiles only when it is relevant to that particular profile. For example, and as will be described later, some data may be relevant to a person as a payer, but not as a payee. Particularly in implementations where a score is being calculated on-the-fly (e.g., in response to a specific transaction being conducted), only data pertinent to a payer profile is accessed and analyzed for purposes of creating a payer score, and only data relating to a payee profile is accessed and analyzed for purposes of creating a payee score. Thus, the unique structure of the database 130 significantly improves the speed and efficiency of computer operations and functions for performing risk score calculations.

The risk system 100 further includes a risk assessment system 140 that is used, among other things, to calculate specific payer risk scores, payee risk scores, and joint risk scores, in a manner and examples of which will be described later. As mentioned earlier, risk scores can be calculated at different times. For example, risk scores may be calculated in advance of a transaction to be evaluated. In such an implementation, the profile system 120 uses rules and logic resulting from risk models that may implemented within risk assessment system 114 to create risk scores on a periodic basis for each person having data within the system, such as at the end of each day after financial institutions 102 have provided updated transaction account data to the data aggregating system 110 and the updated data has been incorporated into the various profiles stored by the profile system 120 at the database 130. Thus, in that implementation, each profile would include a risk score that is been periodically updated and when a risk assessment is requested, and that score could be returned by the profile system 120.

In other implementations, either in addition to or in lieu of periodically calculating risk scores, a risk score could be calculated at the time of a specific transaction, using transaction data for the specific transaction under review and giving rise to the request. Calculating (or updating) a score based on a transaction being reviewed for risk has significant advantages, such as being able to compare current transaction characteristics to past transaction patterns of a payer or payee. This may be particularly advantageous in the case of a joint score, where there might be a few (if any) past transactions between the two parties, but the current transaction may be consistent (or suspiciously inconsistent) with past transaction patterns associated with either a payer or payee. Examples of rules and logic within risk assessment system 144 for calculating risk scores, including the use of data from the specific transaction under review, will be provided later.

Finally, in connection with FIG. 1, there is illustrated an inquiring institution 150. The inquiring institution 150 may be a bank (such as one of the financial institutions 102) that has a transaction to be reviewed for risk and that provides to the risk assessment system 140 a request for risk assessment. The inquiring institution 150 would receive back, in response to the request and for the specific transaction under review, a payer risk score, a payee risk score and a joint/fusion risk score. A general representation for one embodiment of the messages between the inquiring institution 150 and the risk assessment 140 is illustrated in FIG. 2.

Figure 2:
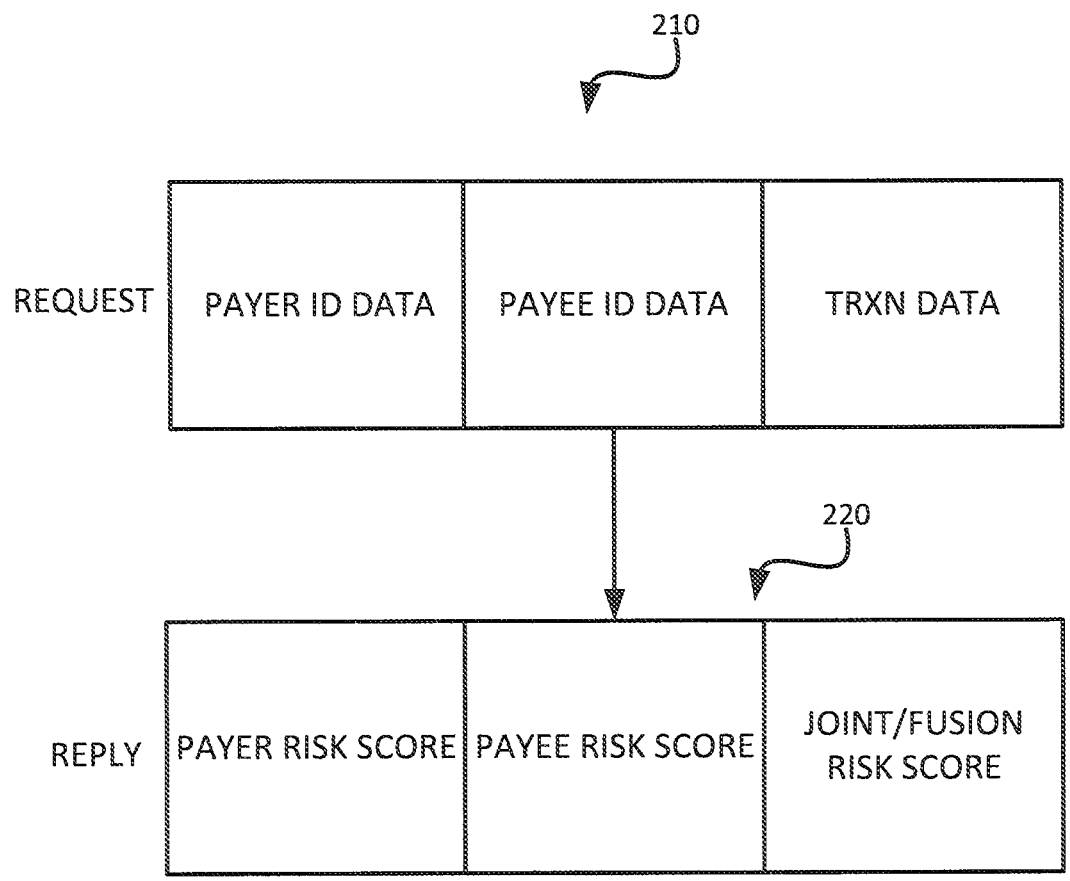
FIG. 2 illustrates the general format of a request for a risk score associated with a transaction, and the response to the request that includes a payer risk score, a payee risk score, and a joint/fusion risk score.

In the embodiment seen in FIG. 2, the inquiring institution 150 includes, in its request 210 for a risk assessment, payer identifying (ID) data, payee identifying (ID) data, and transaction data (data relating to the transaction being reviewed for risk). In the case of a P2P payment being processed, the payer identifying data would typically be a social security number or similar personal ID for the payer (e.g., established for the payer when the payer has set up the payment account with the P2P system). Alternatively, other forms of personal information could be provided that would uniquely identify the payer, such as, in combination, a name, address and telephone number which could be uniquely matched to identifying data associated with a specific payer profile in the profiles 132. The payee identifying data in the request, particularly in the case of a P2P payment being reviewed, may consist of only a single piece of uniquely identifying information, such as the payee's email address or cell phone number (sometimes referred to as an identifying "token" for the payee or receiver in a P2P transaction). The identifying token could be matched to the email address or cell phone number associated with a payee profile. The transaction data in the request would include characteristics or features of the transaction that might be useful for assessing risk, such as the transaction date and amount. The response 220 seen in FIG. 2 would include, as described earlier, a payer risk score (reflecting the risk associated with the payer/sender), a payee risk score (reflecting the risk associated with the payee/receiver), and a joint/fusion risk score (reflecting the risk associated with a transaction between that specific payer and that specific payee). In some cases, an individual score (such as a joint/fusion risk score) may not be available, and the reply will so indicate.

Figure 3:
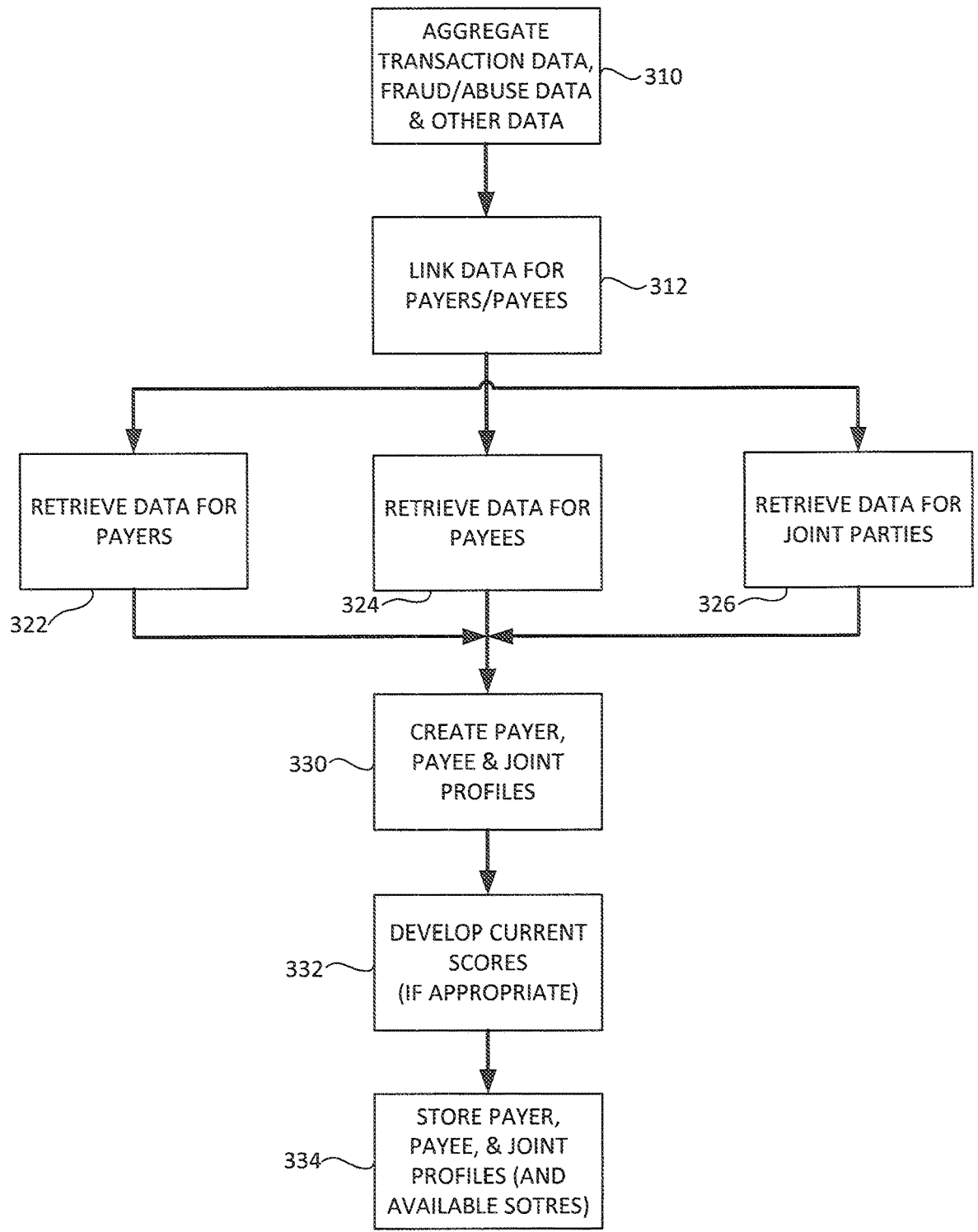
FIG. 3 is a flow diagram illustrating an overall process for creating a payer profile, a payee profile and a joint profile, including risk scores, for a transaction.

Turning now to FIG. 3, there is illustrated an overall process whereby information received from the financial institutions 102, services 104 and databases 106 is aggregated and linked, and then used to create separate payer, payee and joint profiles (and scores). At step 310, the data aggregating system 110 collects and aggregates data from the various sources 102, 104 and 106 as described earlier. The data associating system 114 then links the received data to specific individuals (payers/payees) at step 312, using a process such as described in U.S. Pat. No. 8,682,764 (referenced earlier). Each set of data linked at step 312 may all be associated with one specific individual, but as described earlier, in some embodiments, data associated with an individual may be relevant to risk for that individual as a payer, but not for that individual as payee, and likewise may be relevant for that individual as a payee, but not relevant to risk for that individual as a payer. As such, data that is useful for payer risk is retrieved, step 322, and data useful for payee risk is retrieved, step 324. Also, specific joint data (relating to identified combined payer and payee risk in a transaction) is retrieved at step 326. The data retrieved at steps 322, 324 and 326 is used to create, at step 330, separate payer, payee and joint profiles (to be described later in conjunction with FIGS. 5A, 5B and 5C).

As will also be described later, the data retrieved at step 326 may include, among other things, past transactions between a specific payer and payee. It should be appreciated that the number of joint profiles could be the much larger than the number of payer and payee profiles, given that each joint profile has data relevant to the risk for each possible combination of payer/payee. However, a joint profile in many cases may have little (or no) information if the payer and payee have not conducted past transactions together.

It should be appreciated that, for at least some of the data being retrieved for the joint profile (step 326), rather than separately accessing large amounts of data stored in the data aggregating system 110, data (particularly data for transactions between the payer and payee) can be obtained by accessing the already assembled data in the payer and payee profiles for the two parties. It should also be appreciated that there is likely to be overlap in the data for any payer profile, payee profile and joint profile involving any given person (e.g., one transaction could be relevant to one person in calculating a payer risk, a payee risk, and a joint risk). As such, in some embodiments, overlapping or common data, if present, could be stored at a single storage location within database 130 as it relates to a given individual in order to more efficiently use storage space, and retrieved when needed for analyzing the separate payer profile, payee profile and joint profile associated with that individual. Further, in some embodiments the profiles in the stored profiles 132, 134 and 136 may have, either in whole or part, indexing data (rather than the underlying profile data itself), identifying a location where each data record/element of a given profile may be found and quickly accessed in database 130.

At step 332 current scores for various profiles may be calculated, and then stored with the profiles at step 334. As noted earlier, the calculation of scores at step 332 might be done in some embodiments when a useful score can be obtained from available data. In other embodiments, a score could be stored with a profile after receiving a risk score request 210 from an inquiring institution 150, and the score has been calculated in order to provide the response 220. However, as also mentioned earlier and as will be described in greater detail below, in many cases, a score will be more useful if it takes into account characteristics of the transaction under review and as such, the score provided in the response 220 may not use the score calculated at step 332, but will be a score calculated using not only profiles associated with the payer and payee but also transaction data associated with the transaction under review. In other embodiments, scores calculated at step 332 and stored at step 334 could be used in conjunction with scores calculated using transaction data for the transaction under review, and then stored as an updated score with its associated profile.

Figure 4:
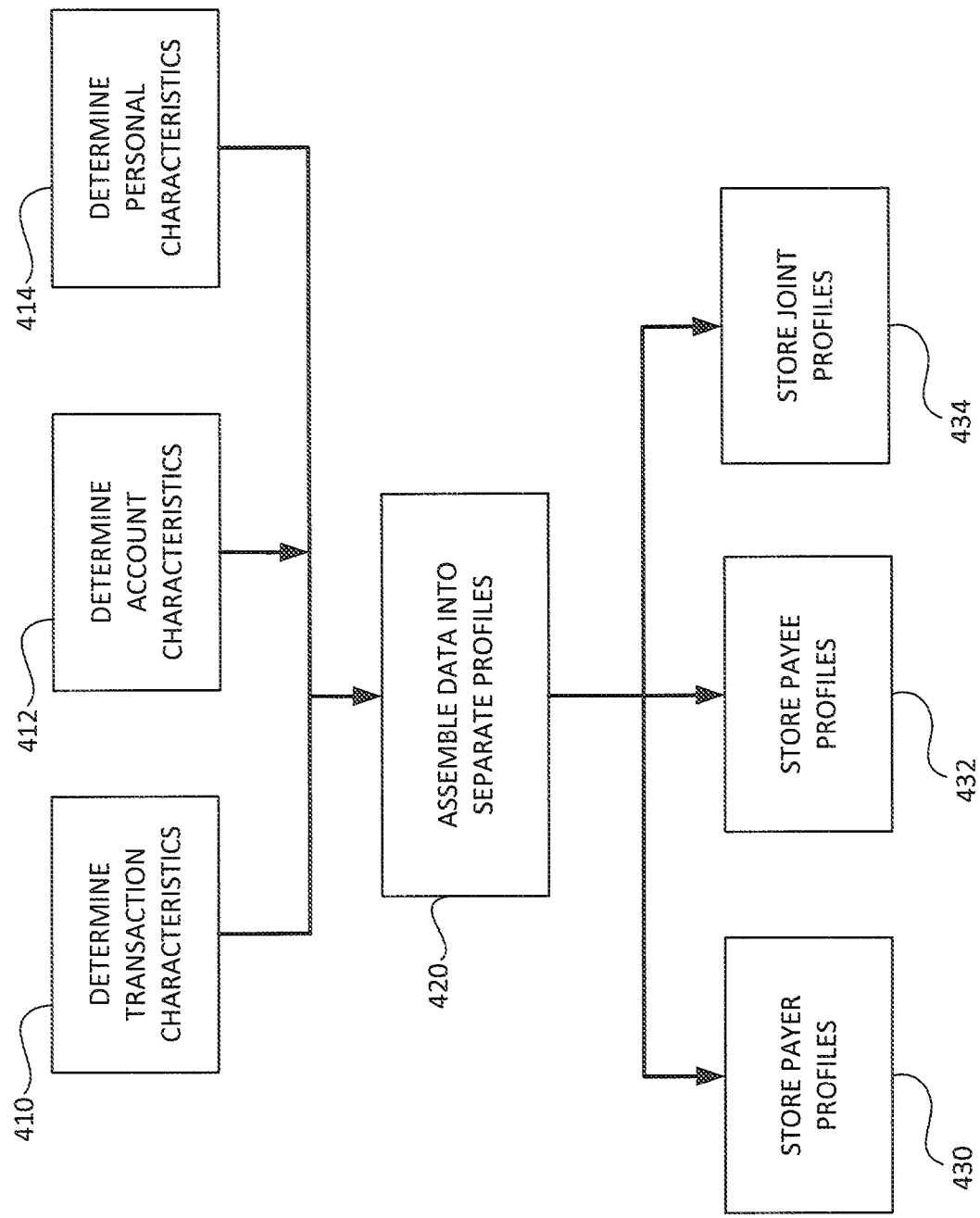
FIG. 4 is a flow diagram illustrating greater detail the creation of a payer profile, a payee profile and a joint profile.

FIG. 4 illustrates a process used in one embodiment for creating payer, payee and joint profiles (at step 330, FIG. 3). In the illustrated embodiment, data received from various sources and linked together by the data associating system 114 (as associated with one specific person) is analyzed by the profile system 120 and sorted at steps 410, 412 and 414 into three types of determined data characteristics.—transaction characteristics, account characteristic, and personal characteristics. Specific examples of data falling into these three types of characteristics will be illustrated in FIGS. 5A, 5B and 5C. However, briefly, transaction characteristics determined at step 410 relate to specific characteristics of past transactions that are relevant to risk of a payer or payee going forward, such as the specific account used for a transaction, payer/payee names and IDs associated with the transaction, the date of the transaction, and the transaction amount. Account characteristics determined at step 412 may include characteristics/data of accounts associated with a payer/payee that are relevant to risk, such as names and IDs associated with the account, the date the account was opened or closed, and account status (current/good, closed, suspended, outstanding insufficient funds, reported account abuse, etc.). Personal characteristics determined at step 414 may include various personal information on any given person (payer/payee) collected from the financial institutions 102 or other sources (such as shared fraud/abuse services 14 or email/phone account databases 106), and could include personal information such as name, address, personal IDs, email addresses, phone numbers and any reported fraud or suspicious activity associated with that person.

At step 420, the data is assembled into the separate profiles (payer, payee and joint) for a given individual and, at steps 430, 432 and 434, the payer profile, payee profile and joint profile(s) for the individual is stored in database 130. In some embodiments, the profiles created and stored at steps 420, 430, 432 and 434, can be created in advance of any request by an inquiring institution. In other embodiments, the profiles may be created and stored upon receiving a request for a risk assessment and scores.

As mentioned earlier, in described embodiments, one person may have both a payer profile (and score) and a payee profile (and score), reflecting different risk as a payer or as a payee. Further, for any given person, there may be multiple joint profiles (and scores), each reflecting data relevant to the risk associated with that person and one other person with whom a transaction is being (or may be) conducted.

FIGS. 5A, 5B and 5C illustrate exemplary profiles that could be created/assembled at profile system 120 from data linked by the data associating system 114 for one specific person (at step 420, FIG. 4) and then stored (in whole or part) in database 130 (steps 430, 432 and 434, FIG. 4).

FIG. 5A illustrates a payer/sender profile for a person, with the payer profile identified by a unique payer ID 510 for that person. The payer ID could be an established unique identifier for the person in question (such as a social security number), but as illustrated in FIG. 5A, a means is needed for distinguishing the different profiles for each person, and thus an "S" has been appended to the personal ID 510, identifying the profile as a payer profile in FIG. 5A and distinguishing the payer profile from the payee profile and joint profile(s) for the same person. As seen, the payer profile in FIG. 5A has three major data components used for calculating a payer/sender risk score, namely, transaction data 520, account data 522, and personal data 524.

Each data record in the transaction data 520 has data elements reflecting various characteristics of transactions that have been linked to the person (e.g., at least one common data element from different transaction records that relate to that same person). The transaction data records are illustrated with elements representing a routing number and account number for the account against which the transaction was posted; a customer (account holder) name, address and ID (this could be a social security number); a payee name/ID; a transaction amount, date and type (e.g., transaction type could be a paper check transaction, ACH transaction, P2P transaction, etc.); phone number(s) for the account holder, the payee or both; and a transaction status (e.g., posted, rejected, canceled, in process, etc.). These data records will in most cases reflect transactions that have been conducted against accounts at one of the financial institutions 102. However, it should be noted that the transactions reflected in transaction data 520 are not necessarily transactions in which the person (for whom the profile was created) was a payer. Rather, transaction data may be useful for assessing risk (as a payer) in transactions where the person was either a payer or a payee, and thus an individual transaction may be one in which the person (for whom the profile was created) was a payee. Further, it should be appreciated that individual transaction records may have been constructed from transactions against accounts at financial institutions that have not contributed data to the data aggregating system 110, but rather may involve an account holder at one of the contributing financial institutions 102 (e.g., an account holder has deposited a check or received an electronic transfer from an account at a non-contributing financial institution). While not shown in FIG. 5A, the transaction data could also reflect a geographical location (e.g., the location of a merchant/payee at which a transaction has taken place).

The account data 522 has data elements pertaining to each account that has been linked to the person, including the routing and account number for the linked account; the customer (account holder) name, address and ID for that account; the date that the account was opened and closed (if applicable); email address(es) associated with the account; a mobile device number or ID that the account holder has registered for use with the account, and the date the device was registered; any phone number(s) associated with the account; and the account status. The account data 522 will normally have come from one of the financial institutions 102 that is contributing data to the data aggregating system 110, and thus has agreed to make that data available for risk analysis (normally, that account data would not be known outside the financial institution maintaining the account).

The personal data 524 contains various information identifying or related to the person for whom the profile was created. In some cases this data may come from the contributing financial institutions 102, but may also come from shared fraud/account abuse services 104 and a P2P system that has contributed personal data for individuals that have payment accounts used for P2P payments.

It should be noted that the various data records in the payer profile may not have data available for every element of the record (such elements indicated by "N/A" in FIG. 5A). For example, certain information related to a transaction may not be available from one of the financial institutions 102, such as account holder addresses or phone numbers (particularly in the case where the transaction relates to an account at a non-contributing financial institution).

Finally, in FIG. 5A there is shown a current payer risk score 530. As mentioned earlier, in some embodiments, even when there has not been a specific request by an inquiring institution 150 (FIG. 1), the profile system 120 may store a payer risk score based on the current profile data available in the payer profile, which can later be accessed and returned when a request is made. In other embodiments, a risk score may be calculated when requested by an inquiring institution 150, and that requested score may be stored as the current payer score 530. The payer score 530 may be updated from time-to-time, either in response to periodic update requests by the profile system (using the risk assessment system 140), or in response to a request for a risk score, in which case the requested risk score may be stored as the current payer score 530.

FIG. 5B illustrates a payee/receiver profile for the same person whose payer profile is illustrated in FIG. 5A. The payee profile in FIG. 5B has similar data to that seen in FIG. 5A, including a unique payer ID 540 (an "R" has been appended to the personal ID, identifying the profile as a payee/receiver profile for the person). Similarly, the payee profile has three major data components for calculating a payee/receiver risk score, namely, transaction data 550, account data 552, and personal data 554, and a current payee score 560.

The transaction data 550 includes transaction records that are relevant to the risk for the person (for whom the payee profile has been created) as a payee, rather than as a payer. In some cases, and as mentioned earlier, a transaction record may overlap and appear in both the payer profile and payee profile for that person but, at least some transaction records may not be the same (transaction records and their elements that may be relevant to payer risk may not be relevant payee risk, and vice a versa). Similarly, account data 552 in the payee profile may include account records that are in the payer profile for the same person, but not necessarily. For example, there may be accounts associated with the person as a payee (accounts that have been used to make payment to the person, and are relevant to the payee risk, but not relevant to the payer risk for that same person). Also similarly, personal data 524 may overlap. However, there may data elements in the personal data 524 not appearing in the payer profile for the same person, such as fraud/abuse codes that may be only relevant to the person because they pertain to fraud/abuse when the person in question was a payee rather than a payer (and thus, a victim rather than a perpetrator of the fraud/abuse).

FIG. 5C illustrates a joint profile for the same person whose payer and payee profiles are illustrated in FIGS. 5A and 5B. As described earlier, there may be multiple joint profiles associated with a person, and only one of those profiles is seen in FIG. 5C. The joint profile includes a unique joint ID 570 (appended to the personal ID is a "J," identifying the profile as a joint profile, and also a number "1," identifying the joint profile as only the first of perhaps several or many joint profiles associated with the person, depending on the number of transactions and other data available for assessing risk between that identified person and each of other people with whom the identified person has conducted or may conduct transactions). In the described embodiment, the joint profile has only transaction data 586 and a current joint/fusion score 590. As should be appreciated, account data and personal data for the two parties associated with the joint profile is available in their respective payer and payee profiles and may not be present or needed in the joint profile. In the described embodiment, it is contemplated that the transaction data 580 will consist primarily of past transactions between the two parties (the first party being the person for whom the payer and payee profiles have been created, and the other party being one of multiple people with whom the first party has or may conduct transactions). Similar to the profiles illustrated in FIGS. 5A and 5B, the joint profile in FIG. 5C has a risk score (current joint/fusion score 590) based on data in the joint profile, which may be updated periodically or when transactions between the two parties are assessed for risk.

Figure 6:
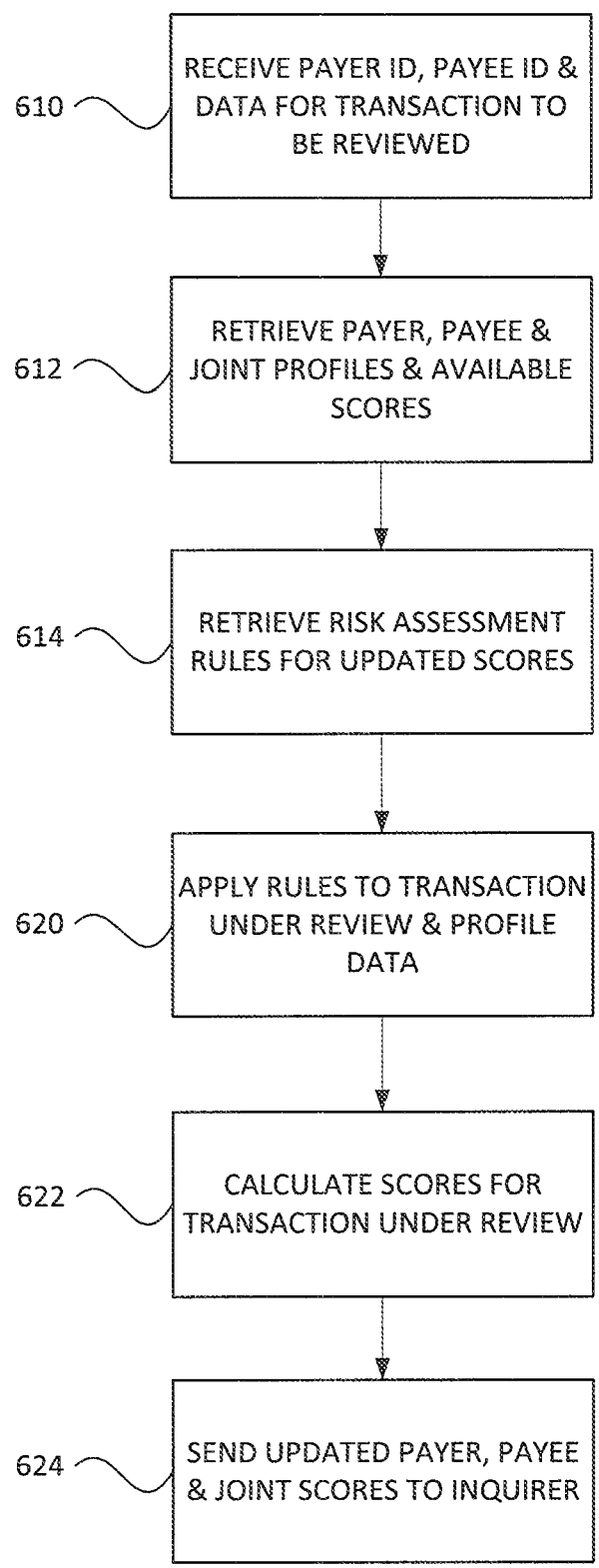
FIG. 6 is a flow diagram illustrating the assessment of a transaction under review, including payer, payee and joint/fusion scores.

Turning now to FIG. 6, there is illustrated a process for developing a risk score in response to an inquiring institution sending a risk score request (such as the risk score request 210 seen in FIG. 2). At step 610, the risk assessment system receives a payer ID, a payee ID and data for the transaction to be reviewed.

In one described embodiment, the transaction is a P2P (person-to-person) payment, and the inquiry is sent by the bank maintaining the account for the payer which is being used to fund the transaction. The bank will have received identifying information regarding the payer from the P2P system. Such payer identifying information may be a social security number sent by the P2P system to the bank (based on personal information provided by the payer to the P2P system when the payer established an account with the P2P system), or may simply be an account number which the bank may use to retrieve a social security number for the account holder. In many cases, the bank will receive little information on the payee, other than perhaps an email address or mobile telephone number ("token") being used to communicate the payment to the payee. Finally, the bank will receive transaction data, such as the amount of the transaction and the date that the transaction has been initiated by the payer. In response to the identifying information for the payer and payee, the risk assessment system 140 (FIG. 1) retrieves, at step 612, a payer profile, a payee profile and a joint profile corresponding to the identified payer and payee. The payer profile may be retrieved based on the social security number or other personal ID known to the bank. The payee profile may be retrieved based on the token (payee profiles will include any email address or phone number associated with each payee, and the token will be compared with stored profile email addresses and phone numbers to identify the correct payee profile). The joint profile, if there is one, may be retrieved based on the payer ID and the payee token.

As described earlier, in some cases, when a profile is retrieved, a score may have been previously calculated for that payer profile, payee profile and, if available, the joint profile. Such a score may, in some cases, be acceptable to the inquiring institution, but it should be understood that a more robust risk score will often be desired by the inquiring institution based on the current transaction being conducted. As such, rules are retrieved (step 614) from within the risk assessment system 140 to apply to the various retrieved profiles and the current transaction data (step 620) in order to calculate a score for the specific transaction under review. The calculated payer, payee and joint scores are sent to the inquiring institution at step 624 (as well as being stored with the corresponding profile).

The rules applied to a transaction at step 620 can be developed based on analysis of large numbers of prior transactions, including transactions identified as having a risk. A risk modeling system for developing such rules will be described later in conjunction with FIG. 7. The following tables illustrate, for a payer (sender) and a payee (receiver) in a P2P payment transaction, exemplary data taken from the current transaction and from data stored in profiles (payer profile, payee profile and joint profile) that could be used to develop a score, and exemplary rules to which that data is applied in order to create a him score.

Exemplary Data from Profiles

TABLE I

Data for Payer/Sender Score

| Data Name | Data Description |
|---|---|
| AMOUNT | Payment amount |
| SENDR_DSNC_FIRST_PAY | Sender days since first P2P payment |
| SENDR_AUDTR_DSNC_REG_COMPL | Sender days since registration (P2P account application) completed |
| SENDR_DSNC_LAST_DEVICE_REG | Sender days since last device registered at any accounts |
| SENDR_NUM_RECV_1D | Sender number of P2P receivers in during past 1 day (24 hours) |
| SENDR_NUM_PAY_90D | Sender number of P2P payments in last 90 days |
| SENDR_NUM_PAY_30D | Sender number of P2P payments in last 30 days |
| SENDR_NUM_PAY_7D | Sender number of P2P payments in last 7 days |
| SENDR_MEAN_PAY_30D | Sender mean amount of P2P payments in last 30 days |
| SENDR_NBBANK | Sender number of banks (having accounts) |
| SENDR_COM_TRANS 90D | Sender total number of completed (successful) transactions in last 90 days at all banks |

TABLE II

Data for Payee/Receiver Score

| | |
|---|---|
| AMOUNT | Payment amount |
| RECV_DAYS_LAST_PW_CHANGE | Receiver Days Since Last password change (at any accounts) |
| RECV_ACCT_DSNC_OPEN | Receiver Days Since Last Account Opened |
| RECV_MEAN_PAY_30D | Receiver mean amount of payments in last 30 day |
| RECV_NUM_PAY_90D | Receiver number of payments in last 90 days |
| RECV_NUM_PAY_30D | Receiver number of payments in last 30 days |
| RECV_NUM_PAY_7D | Receiver number of payments in last 7 days |
| RECV_NUM_ACCT | Receiver number of consumer bank accounts |
| ST_HH_CURR | Receiver accounts in hard hit status (i.e., high risk status) |
| RECV_NBBANK | Receiver total number of banks (having accounts) |
| RECV_COM_TRANS 90D | Receiver total number of completed (successful) transactions in last 90 days at all banks |

TABLE III

Data For Joint Score

| | |
|---|---|
| AMOUNT | Payment amount |
| SENREC_MAX_PAY_PER_1D | Sender/Receiver maximum (highest) payments in last 1 day (24 hours) |
| SENREC_NUM_PAY_90D | Sender/Receiver number of P2P payments in last 90 days |
| SENREC_TOT_PAY 90D | Sender/Receiver number of payments (all accounts) in last 90 days |
| SENREC_MEAN_PAY_90D | Sender/Receiver mean of all payments last 90 days |

Exemplary Rules from Risk Modeling System

TABLE IV

Rules for Payer/Sender Score

| Rule ID | Rule Description | Risk Score Value |
|---|---|---|
| 001S | Sender risk based on Amount of Transaction | |
| | 0-50 | 0 |
| | 51-100 | 10 |

TABLE IV-continued

Rules for Payer/Sender Score

| Rule ID | Rule Description | Risk Score Value |
|---|---|---|
|  | 101-250 | 25 |
|  | 251-500 | 30 |
|  | >501 | 50 |
| 002S | Sender days since first P2P payment |  |
|  | >180 days | 0 |
|  | 60-179 days | 10 |
|  | 15-59 days | 25 |
|  | 5-4 days | 30 |
|  | <5 days | 50 |
| 003S | Sender days since registration |  |
|  | >365 | 0 |
|  | 10-364 | 20 |
|  | <10 | 50 |
| 004S | Sender days since last device registered at any accounts |  |
|  | >365 days | 0 |
|  | 60-364 days | 10 |
|  | 15-59 days | 25 |
|  | 5-4 days | 30 |
|  | <5 days | 50 |
| 005S | Sender number of P2P receivers in during past 1 day (24 hours) |  |
|  | <2 | 0 |
|  | 3-5 | 10 |
|  | 6-10 | 25 |
|  | 11-20 | 30 |
|  | >20 | 50 |
| 006S | Sender number of P2P payments in last 90 days |  |
|  | >10 | 0 |
|  | 11-20 | 10 |
|  | 21-30 | 25 |
|  | 31-50 | 30 |
|  | >50 | 50 |
| 007S | Sender number of P2P payments in last 30 days |  |
|  | <2 | 0 |
|  | 3-5 | 10 |
|  | 6-10 | 25 |
|  | 11-20 | 30 |
|  | >20 | 50 |
| 008S | Sender number of P2P payments in last 7 days |  |
|  | 0 | 0 |
|  | 1-5 | 10 |
|  | 6-8 | 25 |
|  | 9-10 | 30 |
|  | >10 | 50 |
| 009S | Present P2P amount greater than 30 day P2P mean |  |
|  | <10% greater | 0 |
|  | 10-20% greater | 20 |
|  | >20% greater | 50 |
| 0010S | Sender number of banks (having accounts) |  |
|  | <2 | 0 |
|  | 3-5 | 20 |
|  | >5 | 50 |
| 011S | Sender completed transactions in last 90 days (all banks) |  |
|  | >20 | 0 |
|  | 1-20 | 20 |
|  | 0 | 50 |

TABLE V

Rules for Payee/Receiver Score

| Rule ID | Rule Description | Risk Score Value |
|---|---|---|
| 001R | Receiver Risk Based on Amount of Transaction |  |
|  | 0-50 | 10 |
|  | 51-100 | 20 |
|  | 101-250 | 30 |
|  | 251-500 | 40 |
|  | >501 | 50 |
| 002R | Receiver Days Since Last password change (at any accounts) |  |
|  | >180 days | 10 |
|  | 60-179 days | 20 |
|  | 15-59 days | 30 |
|  | 5-4 days | 40 |
|  | <5 days | 50 |
| 003R | Receiver Days Since Last Account Opened |  |
|  | >180 days | 10 |
|  | 60-179 days | 20 |
|  | 15-59 days | 30 |
|  | 5-4 days | 40 |
|  | <5 days | 50 |
| 004R | Receiver mean amount of payments in last 30 day |  |
|  | 0 | 0 |
|  | 1-100 | 2 |
|  | 101-500 | 3 |
|  | >500 | 5 |
| 005R | Receiver number of P2P payments in last 90 days |  |
|  | >10 | 0 |
|  | 11-20 | 10 |
|  | 21-30 | 25 |
|  | 31-50 | 30 |
|  | >50 | 50 |
| 006R | Receiver number of P2P payments in last 30 days |  |
|  | <2 | 0 |
|  | 3-5 | 10 |
|  | 6-10 | 25 |
|  | 11-20 | 30 |
|  | >20 | 50 |
| 007R | Receiver number of P2P payments in last 7 days |  |
|  | 1-5 | 0 |
|  | 6-8 | 10 |
|  | 9-10 | 25 |
|  | >10 | 50 |
| 008R | Receiver number of consumer bank accounts |  |
|  | <2 | 0 |
|  | 3-5 | 20 |
|  | >5 | 50 |
| 009R | Receiver Accounts in Hard Hit Status (i.e., high risk status) |  |
|  | 0 | 0 |
|  | 1-2 | 25 |
|  | >2 | 50 |
| 010R | Receiver total number of banks (having accounts) |  |
|  | <2 | 0 |
|  | 3-5 | 20 |
|  | >5 | 50 |
| 011R | Receiver total number of completed (successful) transactions in last 90 days at all banks |  |
|  | >20 | 0 |
|  | 1-20 | 20 |
|  | 0 | 50 |

TABLE VI

Rules for Joint Score

| Rule ID | Rule Description | Risk Score Value |
|---|---|---|
| 001J | Maximum (highest) payment value between sender/receiver in last 24 hours | |
| | <50 | 0 |
| | 50-100 | 25 |
| | >100 | 50 |
| 002J | Number of successful P2P payments between sender/receiver for same amount in past 30 days | |
| | >1 | 0 |
| | 1 | 25 |
| | 0 | 50 |
| 003J | Sender/Receiver total number of successful payments (all accounts) in past 90 days | |
| | >1 | 0 |
| | 1 | 25 |
| | 0 | 50 |
| 004J | Present P2P amount compared to 90-day mean of all transactions between Sender/Receiver | |
| | 0% (same) | 0 |
| | 1-20% greater | 25 |
| | >20% greater | 50 |

In one embodiment, the risk score values for the payer, payee and joint parties are each separately combined and provided as a separate payer risk score, payee risk score, and a joint/fusion risk score. The combined risk score values could be normalized (e.g., each converted to a score between 0 and 100, with 0 representing no risk and 100 representing the highest risk. Among other things, providing separate payer, payee and joint/fusion scores permit the inquiring institution to better determine which of the parties, if any, may be involved in fraud.

Figure 7:
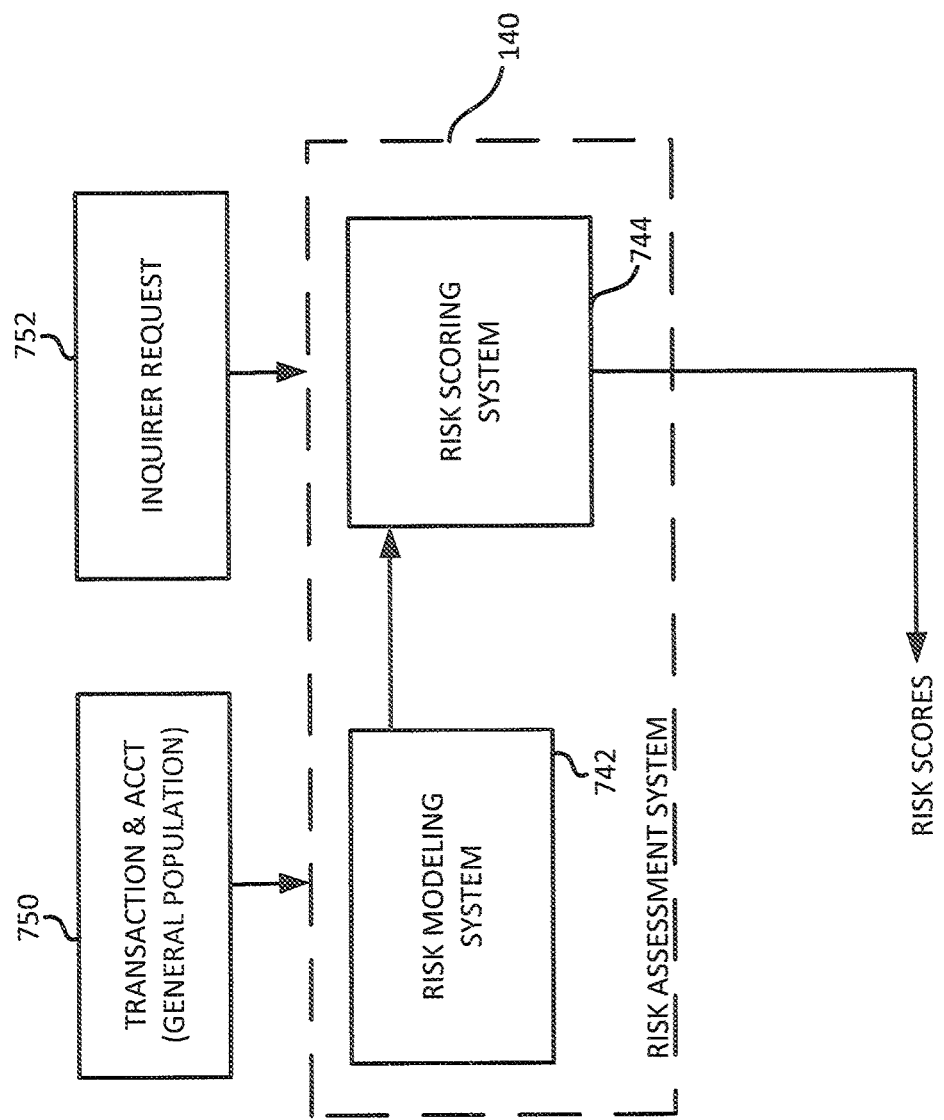
FIG. 7 illustrates in greater detail the risk assessment system seen in FIG. 1.

Turning now to FIG. 7, there are illustrated further details concerning the risk assessment system 140 described earlier in conjunction with FIG. 1. As seen, the system 140 includes two major components, a risk modeling system 742 and a risk scoring system 744. The risk modeling system is used to create rules for calculating payer, payee and joint/fusion risk scores such as the rules illustrated in Tables IV, V and VI immediately above.

The risk modeling done within risk modeling system 742 can be accomplished in different ways. In one embodiment logistic regression is used to evaluate large amounts of data from many financial institutions, such as the transactions and other data described earlier as received by the data aggregating system 110 (e.g., step 310 in FIG. 3). Such large amounts of transaction and account data 750 (indicated as coming from a very large, general population of people and their transactions) is provided to the risk modeling system 742, where specific past transactions identified as fraudulent have their characteristics analyzed using the predictive analysis of logistic regression to identify those characteristics of transactions, from the perspective of a payer, a payee and both the payer and payee together, that may be relevant to risk. Based on those characteristics, rules are developed that will be applied to past transactions (and to current transactions) and other data relating to an individual payer and payee. Logistic regression is particularly useful since it is suited for identifying the probability of a binary event/dependent variable (e.g. fraudulent transaction—yes/no).

However, it should be appreciated that other forms of predictive analysis could be used, such as analysis using heuristics, a fuzzy logic system, a neural network engine, and other systems implementing artificial intelligence or machine learning.

It should also be appreciated that the rules provided by the risk modeling system 742 are not static, but as large amounts of transaction and other data are continuously received, aggregated and provided to the risk modeling system 742, rules are continuously updated to accurately reflect probability based on additional transactions, including those with confirmed fraud.

Once rules have been developed at the risk modeling system 742, they are provided to the risk scoring system 744. When an inquiring institution sends a request 752 (having a format, such as the request 210 seen in FIG. 2) that is received at the risk scoring system 744, the rules are applied to the profile data and transaction data to generate risk scores (payer, payee and joint).

Figure 8:
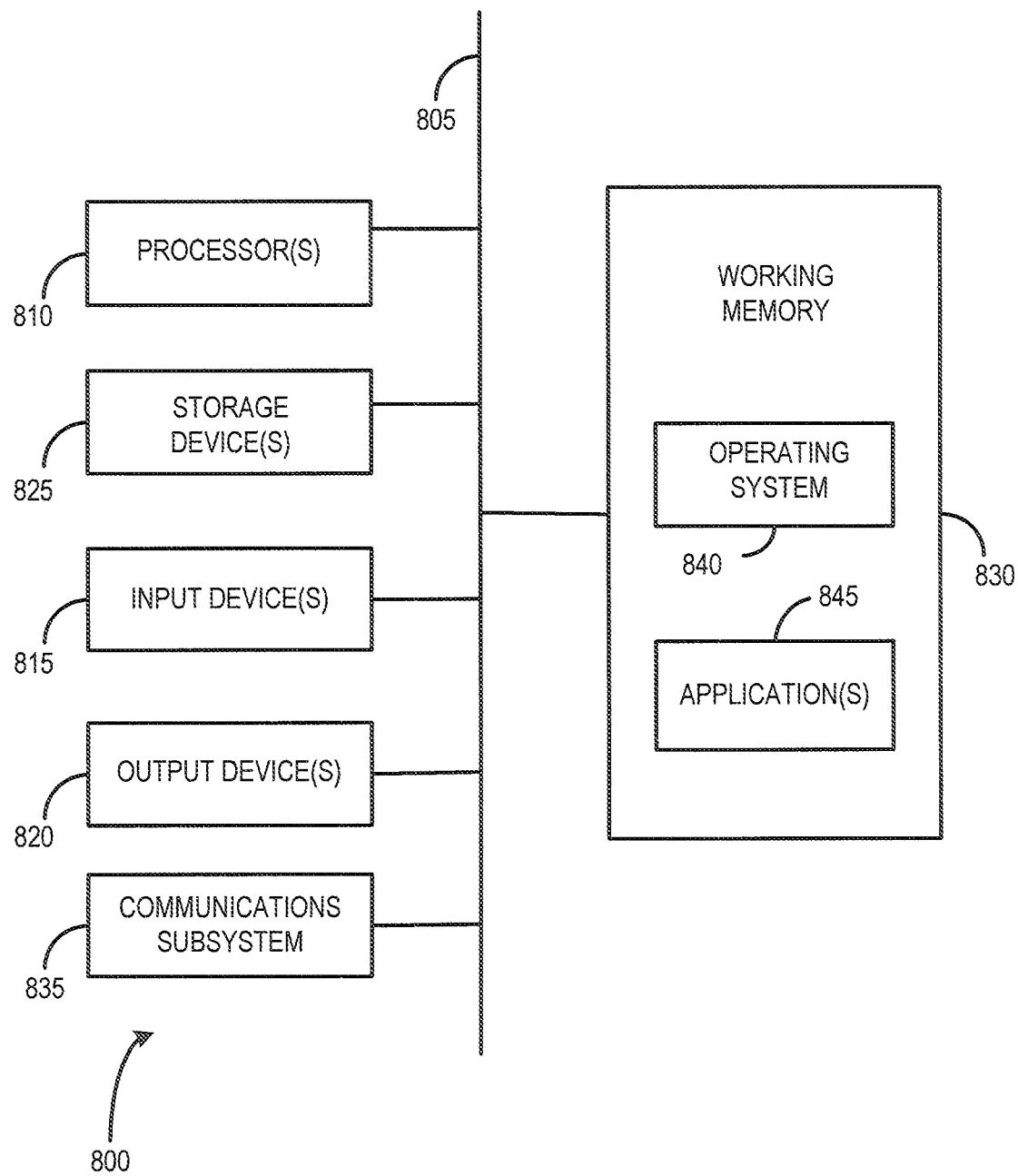
FIG. 8 illustrates in simplified form an exemplary computer system upon which embodiments of the present invention may be implemented.

FIG. 8 is a block diagram illustrating an exemplary computer system upon which embodiments of the present invention may be implemented. This example illustrates a computer system 800 such as may be used, in whole, in part, or with various modifications, to provide the functions of the data aggregating system 110, data associating system 114, profile system 120 and risk assessment system 140, as well as other components and functions of the invention described herein.

The computer system 800 is shown comprising hardware elements that can be electrically coupled or otherwise in communication via a bus 805. The hardware elements can include one or more processors 810, including, without limitation, one or more general-purpose processors and/or one or more special-purpose processors (such as digital signal processing chips, graphics acceleration chips, and/or the like); one or more input devices 815, which can include, without limitation, a mouse, a keyboard and/or the like; and one or more output devices 820, which can include, without limitation, a display device, a printer and/or the like.

The computer system 800 may further include one or more storage devices 825, which can comprise, without limitation, local and/or network accessible storage or memory systems having computer or machine readable media. Common forms of physical and/or tangible computer readable media include, as examples, a hard disk, an optical medium (such as CD-ROM), a random access memory (RAM), a read only memory (ROM) which can be programmable or flash-updateable or the like, and any other memory chip, cartridge, or medium from which a computer can read data, instructions and/or code. In many embodiments, the computer system 800 will further comprise a working memory 830, which could include (but is not limited to) a RAM or ROM device, as described above.

The computer system 800 also may further include a communications subsystem 835, such as (without limitation) a modem, a network card (wireless or wired), an infra-red communication device, or a wireless communication device and/or chipset, such as a Bluetooth® device, an 802.11 device, a WiFi device, a WiMax device, a near field communications (NFC) device, cellular communication facilities, etc. The communications subsystem 835 may permit data to be exchanged with a network, and/or any other devices described herein. Transmission media used by communications subsystem 835 (and the bus 805) may include copper wire, coaxial cables and fiber optics. Hence, transmission media can also take the form of waves (including, without limitation radio, acoustic and/or light waves, such as those generated during radio-wave and infra-red data communications).

The computer system 800 can also comprise software elements, illustrated within the working memory 830, including an operating system 840 and/or other code, such as one or more application programs 845, which may be designed to implement, as an example, the processes seen in FIGS. 3, 4 and 6, and thus provide specially designed and programmed devices (e.g., profile system 120 and risk assessment system 140) for carrying out the unique elements of those processes and novel features described herein.

As an example, one or more methods discussed earlier might be implemented as code and/or instructions executable by a computer (and/or a processor within a computer). In some cases, a set of these instructions and/or code might be stored on a computer readable storage medium that is part of the system 800, such as the storage device(s) 825. In other embodiments, the storage medium might be separate from a computer system (e.g., a removable medium, such as a compact disc, etc.), and/or provided in an installation package with the instructions/code stored thereon. These instructions might take the form of code which is executable by the computer system 800 and/or might take the form of source and/or installable code, which is compiled and/or installed on the computer system 800 (e.g., using any of a variety of generally available compilers, installation programs, compression/decompression utilities, etc.). The communications subsystem 835 (and/or components thereof) generally will receive the signals (and/or the data, instructions, etc., carried by the signals), and the bus 805 then might carry those signals to the working memory 830, from which the processor(s) 810 retrieves and executes the instructions. The instructions received by the working memory 830 may optionally be stored on storage device 825 either before or after execution by the processor(s) 810.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the profile system 120 and risk assessment 140 may each be implemented by a single system having one or more storage device and processing elements. As another example, the systems 120 and 140 may be implemented by plural systems, with their respective functions distributed across different systems either in one location or across a plurality of linked locations.

Moreover, while the various flows and processes described herein (e.g., those illustrated in FIGS. 3, 4 and 6) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for evaluating risk associated with a payment transaction between a payer and a payee, comprising:
   a data aggregating system, including a processor and a memory in the data aggregating system, the memory in the data aggregating system storing instructions executable by the processor that configure the data aggregating system to receive, from a plurality of financial institutions, account data associated with a plurality of accounts maintained at the financial institutions, wherein the account data includes at least transaction data pertaining to transactions conducted against each of the plurality of accounts;
   a linking system, including a processor and a memory in the linking system, the memory in the linking system storing instructions executable by the processor that configure the linking system to receive the account data from the data aggregating system and evaluate the account data to identify account data representing transactions and accounts that each have a common element relating to a specified person;
   a profile system, including a processor and a memory in the profile system, the memory in the profile system storing instructions executable by the processor that configure the profile system to (1) receive, from the data aggregating system, account data identified by the linking system as representing transactions and accounts having common elements relating to a specified person, and for the identified account data, (2) assign, at the profile system, at least a portion of the identified account data to a payer profile, the payer profile having account data pertaining to the specified person as a payer, (3) assign at least a portion of the identified account data to a separate payee profile, the payee profile having account data pertaining to the specified person as a payee, and (4) assign at least a portion of the identified account data to a separate joint profile, the joint profile having account data pertaining to a transaction between the specified person and at least one other party, wherein each specified person has a corresponding payer profile, payee profile, and joint profile, and wherein the profile system separately stores the payer profile, the payee profile and the joint profile corresponding to each specified person; and
   a risk assessment system, including a processor and a memory in the risk assessment system, the memory in the risk assessment system storing instructions executable by the processor that configure the risk assessment system to (1) evaluate, for a specified payment transaction having an identified payer and an identified payee, risk associated with the specified payment transaction, based on at least the payer profile for the identified payee, the payee profile for the identified payee, and the joint profile pertaining to both the identified payer and the identified payee (2) calculate a payer score, a payee score, and a joint score for the specified payment transaction by retrieving rules from the risk assessment system and applying the rules to the payer profile, payee profile, and joint profile, and (3) provide the payer score, payee score and joint score for storing the payer score in association with the payer profile, storing the payee score in association with the payee profile and storing the payee score in association with the joint profile.

2. The system of claim 1, wherein the payment transaction between a payer to a payee is an electronic payment transaction having a payment amount funded from a financial account of the payer maintained at one of the financial institutions.

3. The system of claim 1, wherein the payer score for the payer profile represents risk associated with the specified person when acting as a payer.

4. The system of claim 1, wherein the payer score for the payee profile represents risk associated with the specified person when acting as a payee.

5. The system of claim 1, wherein the joint score for the joint profile represents risk associated with a transaction between the specified person and the other party.

6. The system of claim 1, wherein the profile system includes an associated memory system that stores separately the payer profile, the payee profile, and the joint profile corresponding to each specified person.

7. The system of claim 6, wherein the profile system stores the score for the payer profile as part of the payer profile associated with the specified person, stores the score for the payee profile as part of the payee profile associated with the specified person, and stores the score for the joint profile as part of the joint profile associated with the specified person.

8. The system of claim 1, wherein the joint profile has account data pertaining to past transactions between the identified payer and the identified payee.

9. The system of claim 1, wherein the account data received by the data aggregating system further includes fraud data from a shared fraud database, identifying any specified person that has engaged in activities determined as involving a risk of fraud, and wherein the shared fraud data is assigned to at least one of the payee profile and payer profile corresponding to that specified person.

10. The system of claim 1, wherein the account data received by the data aggregating system further includes account abuse data from a shared account abuse database, identifying any specified person that has engaged in activities determined as involving a risk of account abuse, and wherein the account abuse data is assigned to at least one of the payer profile and payer profile corresponding to that specified person.

11. The system of claim 1, wherein the risk assessment system receives, for the specified payment transaction, payer identifying data, payee identifying data, and transaction data, the transaction data including at least a transaction date and a transaction amount.

12. The system of claim 1, wherein the specified payment transaction is a person-to-person (P2P) transaction, wherein the payer is sending payment, funded from an account at one of the plurality of financial institutions, and the payee is receiving such payment, with the payee notified of the payment through electronic communications to a device of the payee.

13. The system of claim 12, wherein the risk assessment system further receives, from a person-to-person (P2P) payment system, transaction data for the P2P transaction conducted through the P2P payment system, including at least a token identifier associated with the payee in such P2P transaction.

14. The system of claim 13, wherein the token identifier comprises an email address.

15. The system of claim 13, wherein the token identifier comprises a mobile telephone number.

16. A method for evaluating risk associated with a payment transaction between a payer and a payee, comprising:
receiving, by a processor of a data aggregating system, from a plurality of financial institutions, account data associated with a plurality of accounts maintained at the financial institutions, wherein the account data includes at least transaction data pertaining to transactions conducted against each of the plurality of accounts;
receiving, by a processor of a linking system, the account data from the data aggregating system, the linking system evaluating the account data and identifying account data representing transactions and accounts that each have a common element relating to a specified person;
receiving, by a processor of a profile system, from the data aggregating system, account data identified by the linking system as representing transactions and accounts having common elements relating to a specified person;
assigning, by the processor of the profile system, at least a portion of the identified account data to a payer profile, the payer profile having account data pertaining to the specified person as a payer;
assigning, by the processor of the profile system, at least a portion of the identified account data to a separate payee profile, the payee profile having account data pertaining to the specified person as a payee;
assigning, by the processor of the profile system, at least a portion of the identified account data to a separate joint profile, the joint profile having account data pertaining to a transaction between the specified person and at least one other party, wherein each specified person has a corresponding payer profile, payee profile, and joint profile and wherein the profile system separately stores the payer profile, the payee profile and the joint profile corresponding to each specified person;
evaluating, by a processor of a risk assessment system, for a specified payment transaction having an identified payer and an identified payee, risk associated with the specified transaction, based on at least the payer profile for the identified payee, the payee profile for the identified payee, and the joint profile pertaining to both the identified payer and the identified payee; and
calculating, by the processor of the risk assessment system, a payer score, a payee score based, and a joint score for the specified transaction by retrieving rules from the risk assessment system and applying the rules to the payer profile, payee profile, and joint profile, and providing the payer score, payee score and joint score for storing the payer score in association with the payer profile, storing the payee score in association with the payee profile and storing the payee score in association with the joint profile.

17. The method of claim 16, wherein the profile system includes an associated memory system that stores separately the payer profile, the payee profile, and the joint profile corresponding to each specified person.

18. The method of claim 17, wherein the profile system stores the score for the payer profile as part of the payer profile associated with the specified person, stores the score for the payee profile as part of the payee profile associated with the specified person, and stores the score for the joint profile as part of the joint profile associated with the specified person.

19. The method of claim 16, wherein the joint profile has account data pertaining to past transactions between the identified payer and the identified payee.

\* \* \* \* \*